(12) United States Patent
Kurata et al.

(10) Patent No.: US 8,499,454 B2
(45) Date of Patent: Aug. 6, 2013

(54) STEERING WHEEL OF VEHICLE AND MANUFACTURING METHOD OF STEERING WHEEL OF VEHICLE

(75) Inventors: Eisuke Kurata, Utsunomiya (JP); Shinya Iijima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 617 days.

(21) Appl. No.: 12/753,478

(22) Filed: Apr. 2, 2010

(65) Prior Publication Data

US 2010/0251849 A1   Oct. 7, 2010

(30) Foreign Application Priority Data

Apr. 3, 2009   (JP) ................. 2009-091357

(51) Int. Cl.
*B21D 53/26* (2006.01)
(52) U.S. Cl.
USPC .................. 29/894.1; 29/897.2
(58) Field of Classification Search
USPC .......... 29/894.1, 897.2, 458, 469; 74/552
See application file for complete search history.

(56) References Cited

U.S. PATENT DOCUMENTS 2,889,714 A * 6/1959 Romano ............... 74/493

FOREIGN PATENT DOCUMENTS

| JP | 61-27762 | 2/1986 |
|---|---|---|
| JP | 62-41284 | 3/1987 |
| JP | 62-071755 A | 4/1987 |
| JP | 03-112772 A | 5/1991 |
| JP | 04-055164 | 2/1992 |
| JP | 05-139319 A | 6/1993 |
| JP | 09-277942 A | 10/1997 |
| JP | 11-059434 A | 3/1999 |
| JP | 2001-180501 A | 7/2001 |
| JP | 2002-205659 A | 7/2002 |
| JP | 2006-137288 A | 6/2006 |
| JP | 2007-246004 | 9/2007 |

OTHER PUBLICATIONS

Human Translation of JP03112772; Hitoshi; May 14, 1991.*

* cited by examiner

*Primary Examiner* — David Bryant
*Assistant Examiner* — Ryan J Walters
(74) *Attorney, Agent, or Firm* — Rankin, Hill & Clark LLP (57) ABSTRACT

A steering wheel of a vehicle includes a steering wheel main body. The steering wheel main body includes a rim part, a boss part, a core metal, and a resin layer. The core metal includes a ring part and an offset part such that a distance from a center of the boss part to the offset part is smaller than a distance from the center of the boss part to the ring part. The resin layer includes a ring part resin layer covering the ring part, and an offset part resin layer covering the offset part. A thickness of the offset part resin layer at an outer side of a radial direction with respect to the offset part is thicker than a thickness of the ring part resin layer at the outer side of the radial direction with respect to the ring part. The resin layer is a complete circle.

3 Claims, 6 Drawing Sheets

STEERING WHEEL OF VEHICLE AND MANUFACTURING METHOD OF STEERING WHEEL OF VEHICLE

BACKGROUND OF THE INVENTION

The present application claims priority on Japanese Patent Application No. 2009-091357, filed Apr. 3, 2009, the content of which is incorporated herein by reference.

FIELD OF THE INVENTION

The present invention relates to a steering wheel of a vehicle and a method for manufacturing a steering wheel of a vehicle.

DESCRIPTION OF THE RELATED ART

A steering wheel of a vehicle (hereinafter referred to as a "steering wheel") includes a ring-shaped rim part, a central boss part, and a spoke part linking the rim part and the boss part. A framework of such steering wheels includes a core metal comprising metallic material such as aluminum. In other words, the core metal includes a rim part core metal (also referred to as the "rim part") which forms a framework of the rim part, a bottom surface core metal (also referred to as the "boss part") which forms a framework of the bottom surface of the boss part, and a linking core metal which links the rim part core metal and the bottom surface core metal. A resin layer including polyurethane, for instance, covers the core metal. In this way, the external appearance of the steering wheel is created.

Various shapes of the rim part of the steering wheel have been developed, considering the design and the operability. Examples of such shapes include a complete circle, an oval, and a flat shape (see, for example, Japanese Unexamined Patent Application, First Publication No. H4-55164 (hereinafter referred to as "Patent Document 1"), and Japanese Unexamined Patent Application, First Publication No. 2007-246004 (hereinafter referred to as "Patent Document 2")). The "flat shape" is such that the rim part is crushed in the radial direction. In further detail, the length of a first diameter of the rim part is different from the length of a second diameter of the rim part which is diagonal to the first diameter. Incidentally, in the following description, a major axial direction refers to a direction in which the longer diameter of the first and second diameter extends. Meanwhile, a minor axial direction refers to a direction in which the shorter diameter of the first and second diameter extends.

In order to manufacture a rim part having various shapes as described above, it is first necessary to manufacture a core metal shaped like the intended shape of the rim part. The core metal is covered with a resin layer in accordance with the shape of the core metal. In this way, it is possible to manufacture a steering wheel comprising a rim part having various shapes as described above.

However, since the core metal is manufactured in accordance with each shape of the steering wheel, the manufacturing cost increases. In addition, the efficiency in manufacturing the steering wheel declines.

SUMMARY OF THE INVENTION

The present invention is made considering the problems described above. Accordingly, an object of the present invention is to provide a steering wheel for a vehicle and a manufacturing method of a steering wheel for a vehicle, which enables a steering wheel with a desired shape to be manufactured while reducing the manufacturing costs and while enhancing the efficiency of manufacturing.

Namely, a steering wheel for a vehicle according to an aspect of the present invention includes a steering wheel main body. The steering wheel main body includes a rim part being ring-shaped, a boss part attached in a side of a steering column, a core metal providing a framework of the steering wheel main body, and a resin layer covering at least the core metal of the rim part. The core metal of the rim part includes a ring part such that a center of the ring part is the boss part. The core metal of the rim part also includes an offset part such that a distance from a center of the boss part to the offset part is smaller than a distance from the center of the boss part to the ring part. The resin layer includes a ring part resin layer covering the ring part, and an offset part resin layer covering the offset part. A thickness of the offset part resin layer at an outer side of a radial direction with respect to the offset part is thicker than a thickness of the ring part resin layer at the outer side of the radial direction with respect to the ring part. In addition, the resin layer is shaped as a complete circle.

According to the present invention, the offset part is placed towards the inner side with respect to the ring part in the radial direction inside the resin layer. Thus, a distance from the center of the boss part in the offset part resin layer may be set comparable to the distance from the center of the boss part in the ring part resin layer. In other words, by placing the offset part at an optional position within the offset part resin layer, the offsetting amount of the offset part can be tolerated within the resin layer. Thus, a steering wheel shaped as a complete circle can be formed using a non-circular core metal comprising an offset part. Therefore, it is not necessary to manufacture a core metal in accordance with each shape of the steering wheel.

As a result, the manufacturing cost can be reduced while enhancing the efficiency of manufacturing the steering wheel. A steering wheel having a desired shape can be manufactured easily.

Furthermore, by using the same core metal, a steering wheel having a desired shape can be manufactured without changing the shape of the core metal. Thus, the present invention is capable of responding quickly to a request for a change in the shape of the steering wheel. In this way, the steering wheel can be designed freely.

In addition, the above steering wheel for the vehicle according to an aspect of the present invention includes a steering wheel main body. The steering wheel main body includes a rim part being ring-shaped, a boss part attached in a side of a steering column, a core metal providing a framework of the steering wheel main body, and a resin layer covering at least the core metal of the rim part. The core metal of the rim part includes a ring part such that a center of the ring part is the boss part. The core metal of the rim part also includes an offset part such that a distance from a center of the boss part to the offset part is smaller than a distance from the center of the boss part to the ring part. The resin layer includes a ring part resin layer covering the ring part, and an offset part resin layer covering the offset part. A thickness of the offset part resin layer at an outer side of a radial direction with respect to the offset part is thinner than a thickness of the ring part resin layer at the outer side of the radial direction with respect to the ring part. In addition, the offset part resin layer forms a flat part.

According to the present invention, the thickness of the offset part resin layer, positioned at an outer side of the offset part in the radial direction, is thinner compared to the thickness of the arc part resin layer, positioned at an outer side of the arc part in the radial direction. Therefore, even if the offsetting amount of the offset part in the radial direction with respect to the arc part is relatively small, it is possible to maintain a large offset amount of the offset part resin layer in the radial direction with respect to the arc part resin layer. As a result, it is possible to accurately manufacture a steering wheel with a non-circular shape such that a first distance from the center of the boss part to the offset part resin layer is smaller compared to a second distance from the center of the boss part to the arc part resin layer in the circumferential direction of the rim part.

Thus, the same core metal can be used to manufacture a steering wheel shaped as a complete circle and a steering wheel with a non-circular shape. In other words, the core metal can be shared among steering wheels with various shapes. Therefore, the manufacturing cost is reduced while the efficiency of manufacturing the steering wheel is enhanced. Consequently, a steering wheel having a desired shape can be easily manufactured.

In addition, the above steering wheel for the vehicle according to an aspect of the present invention may be configured as follows: at a first position with a first phase difference of +90 degrees from a center of the flat part in a circumferential direction, and at a second position with a second phase difference of −90 degrees from the center of the flat part in the circumferential direction, a first thickness of the ring part resin layer at the outer side of the radial direction with respect to the ring part is thicker than a second thickness of the ring part resin layer at an inner side of the radial direction with respect to the ring part.

According to the present invention, a distance from the center of the boss part to a position on the arc part resin layer which has a phase difference of ±90 degrees from the center of the flat part in the circumferential direction can be increased compared to a case in which the thickness of the arc part resin layer is equal at both sides of the arc part in the radial direction. Here, the major axial direction corresponds to a position with a phase difference of ±90 degrees from the center of the flat part in the circumferential direction. The minor axial direction corresponds to the center of the flat part. The ratio of the major axial direction and the minor axial direction can be increased compared to a case in which the thickness of the arc part resin layer is equal at both sides of the arc part in the radial direction. Thus, the overall external shape of the steering wheel can be more flattened. Therefore, by using the same core metal, it is possible to manufacture a steering wheel having a desired shape without changing the shape of the core metal. Consequently, the steering wheel can be designed freely.

By the way, a manufacturing method of a steering wheel for a vehicle according to an aspect of the present invention includes a first step, a second step, and a third step. The steering wheel for the vehicle includes a steering wheel main body. The steering wheel main body includes a rim part being ring-shaped, a boss part attached in a side of a steering column, and a core metal providing a framework of the steering wheel main body. The core metal of the rim part includes a ring part such that a center of the ring part is the boss part. The core metal of the rim part further includes an offset part such that a distance from a center of the boss part to the offset part is smaller than a distance from the center of the boss part to the ring part. In addition, a resin layer covers at least the core metal of the rim part. In the first step, a plurality of the core metals are formed. In the second step, a first steering wheel, forming the rim part shaped as a complete circle, is formed. In the third step, a second steering wheel, forming a flat part along a circumferential direction of the rim part, is formed.

Furthermore, in the second step of forming the first steering wheel, a first thickness of the resin layer at an outer side of a radial direction with respect to the offset part is set to be thicker than a second thickness of the resin layer at the outer side of the radial direction with respect to the ring part. In addition, in the third step of forming the second steering wheel, the first thickness of the resin layer at the outer side of the radial direction with respect to the offset part is set to be thinner than the second thickness of the resin layer at the outer side of the radial direction with respect to the ring part.

According to the present invention, during a process for manufacturing the first steering wheel, a first thickness of the resin layer at an outer side of the offset part in the radial direction is set to be thicker than a second thickness of the resin layer at an outer side of the arc part in the radial direction. Thus, the offset part is placed in the resin layer at an inner side with respect to the arc part in the radial direction. In this way, it is possible to make the shape of the steering wheel a complete circle without exposing the offset part from the resin layer.

Meanwhile, during a process for manufacturing the second steering wheel, a first thickness of the resin layer at an outer side of the offset part in the radial direction is set to be thinner than a second thickness of the resin layer at an outer side of the arc part in the radial direction. Thus, even in a case in which the offset amount of the offset part with respect to the arc part is relatively small, it is possible to retain a large offset amount at the resin layer. Consequently, it is possible to manufacture a non-circular steering wheel shaped so that a first distance from the center of the boss part at a resin layer of the offset part is smaller compared to a second distance from the center of the boss part at a resin layer of the arc part.

Therefore, it is possible to manufacture a steering wheel shaped like a complete circle and a non-circular steering wheel while using the same core metal. In other words, the core metal can be shared. Thus, it is not necessary to create a core metal separately for each shape of steering wheel. In addition, the manufacturing cost can be reduced while enhancing the efficiency of manufacturing the steering wheel. It is therefore possible to easily manufacture a steering wheel having a desired shape.

Furthermore, the same core metal can be used to manufacture a steering wheel having a desired shape without altering the shape of the core metal. Therefore, it is possible to quickly respond to a request to change the shape of the steering wheel. Hence, the steering wheel can be designed freely.

According to the present invention, the offset part is placed in the resin layer at an inner side with respect to the arc part in the radial direction. Thus, a first distance from the center of the boss part at the offset part resin layer can be set in the same manner as a second distance from the center of the boss part at the arc part resin layer. In other words, by placing the offset part at an optional position inside the offset part resin layer, it is possible to tolerate the offsetting amount of the offset part within the resin layer. Thus, a non-circular core metal comprising an offset part can be used to manufacture a steering wheel shaped as a complete circle. Therefore, it is not necessary to manufacture a core metal for each shape of the steering wheel.

Therefore, the manufacturing cost can be lowered while enhancing the efficiency of manufacturing the steering wheel. In this way, a steering wheel having a desired shape can be easily manufactured.

In addition, by using the same core metal, a steering wheel having a desired shape can be manufactured without altering the shape of the core metal. Thus, it is possible to promptly respond to a request for a change in the shape of the steering wheel. Hence, the steering wheel can be designed freely.

BRIEF DESCRIPTION OF THE DRAWINGS

FIG. 3A is a cross-sectional view along line A-A of FIG. 1.

FIG. 3B is a cross-sectional view along line B-B of FIG. 1.

FIG. 3C is a cross-sectional view along line C-C of FIG. 1.

FIG. 5A is a cross-sectional view along line A'-A' of FIG. 4.

FIG. 5B is a cross-sectional view along line B'-B' of FIG. 4.

FIG. 5C is a cross-sectional view along line C'-C' of FIG. 4.

FIG. 6 shows a skeletal plane view of a steering wheel (rim part).

DETAILED DESCRIPTION OF THE PREFERRED EMBODIMENTS

Hereinafter, an embodiment of the present invention is described with reference to the attached figures. In the present application, an x direction refers to a direction along a central axis of a steering wheel. In other words, the x direction corresponds to an axial direction of a steering column. A rear direction of the vehicle is set to be the "+x" direction. The left-right direction of the vehicle is set to be the y direction. The z direction is a direction perpendicular to the x-y direction. An upper direction of the vehicle is set to be the "+z" direction. In addition, a frontal side refers to a side of an operator of the steering wheel. A back side is set to be the side opposite to the frontal side. Furthermore, in the following description, a radial direction refers to the radial direction of the steering wheel in the y-z plane. A circumferential direction refers to the circumferential direction of the steering wheel.

First Embodiment

Hereinafter, a first embodiment of the present invention is described. In particular, a steering wheel is described.

Figure 1:
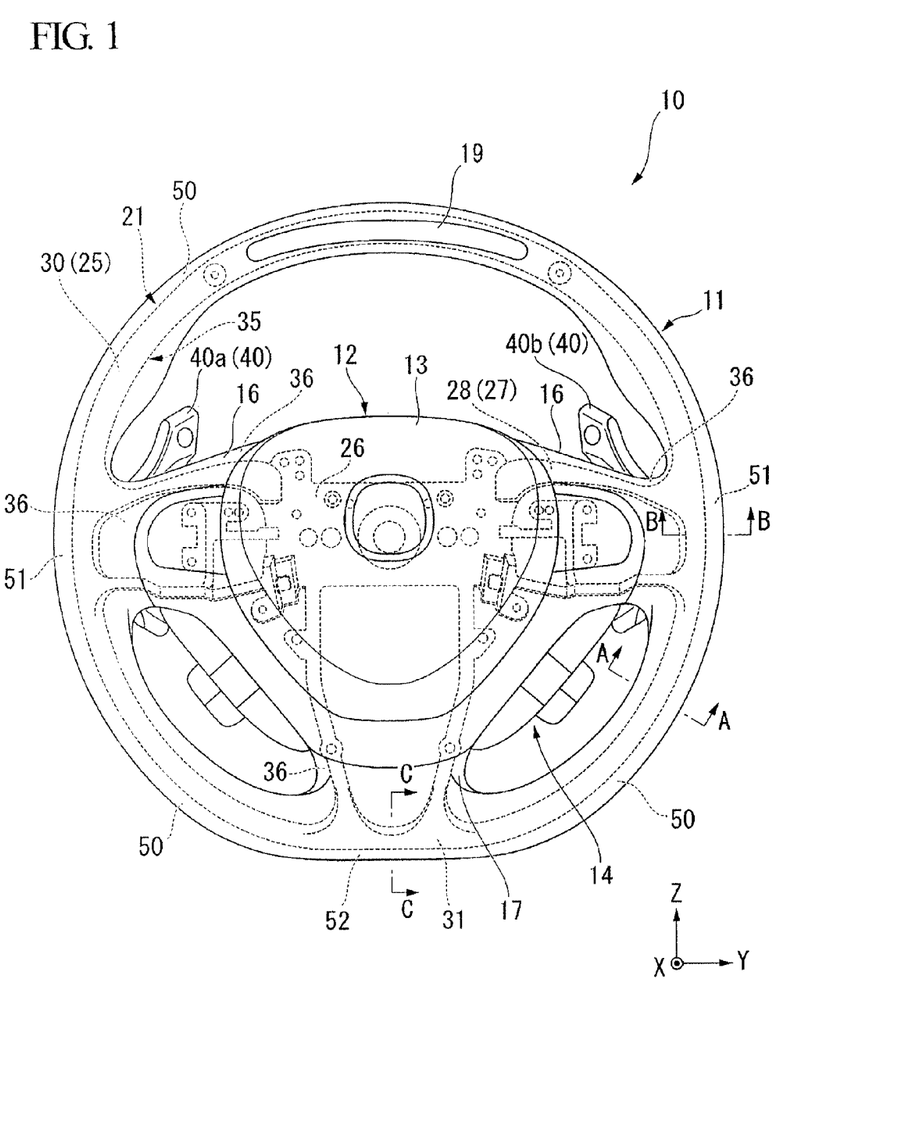
FIG. 1 is a frontal view of a steering wheel according to a first embodiment of the present invention.

FIG. 1 is a frontal view of the steering wheel 10. The steering wheel 10 (the steering wheel for a vehicle) includes a rim part 11 in a circumferential section, a boss part 12 in a central section, and a spoke part 16, 17 connecting the rim part 11 and the boss part 12. The spoke part 16, 17 includes a pair of first spoke parts 16, 16 and a second spoke part 17. The pair of first spoke parts 16, 16, extend from the boss part 12 towards the ±y direction. The second spoke part 17 extends from the boss part 12 towards the -z direction.

The rim part 11 is formed as a ring. An indicator 19 is placed at an upper section of the rim part 11. The lighting condition of the indicator 19 changes according to the number of rotations of the engine.

The boss part 12 is formed as a reversed triangle. The boss part 12 is rotatably supported from the back side by a steering column (not diagramed). A horn pad 13 is placed at a frontal face of the boss part 12. The horn pad 13 functions as a switch to set off an alarm. The boss part 12 is placed in the -x direction with respect to the rim part 11. An air bag, for instance, is stored inside the horn pad 13.

Various switches for a vehicle (hereinafter may be referred to as a "vehicle switch") are provided on the steering wheel 10. For example, a cluster of switches 14 such as an operating switch of an air conditioner and an operating switch of a car phone is provided as a vehicle switch between the first spoke part 16 along a rim part at a lower half section of the boss part 12.

In addition, a paddle switch 40 is provided as a vehicle switch. The paddle switch 40 operates a change in the velocity of the vehicle. A shifting down switch 40a and a shifting up switch 40b are provided as a paddle switch 40. The shifting down switch 40a performs a shifting down operation. The shifting up switch 40b performs a shifting up operation. A pair of paddle switches 40 is provided on the back side of a pair of first spoke parts 16. Incidentally, an electrical unit, which controls these various vehicle switches and the driving of the indicator 19, is provided on the back side of the horn pad 13 or the cluster of switches 14.

Hereinafter, an inner structure of a steering wheel is described.

Figure 2:
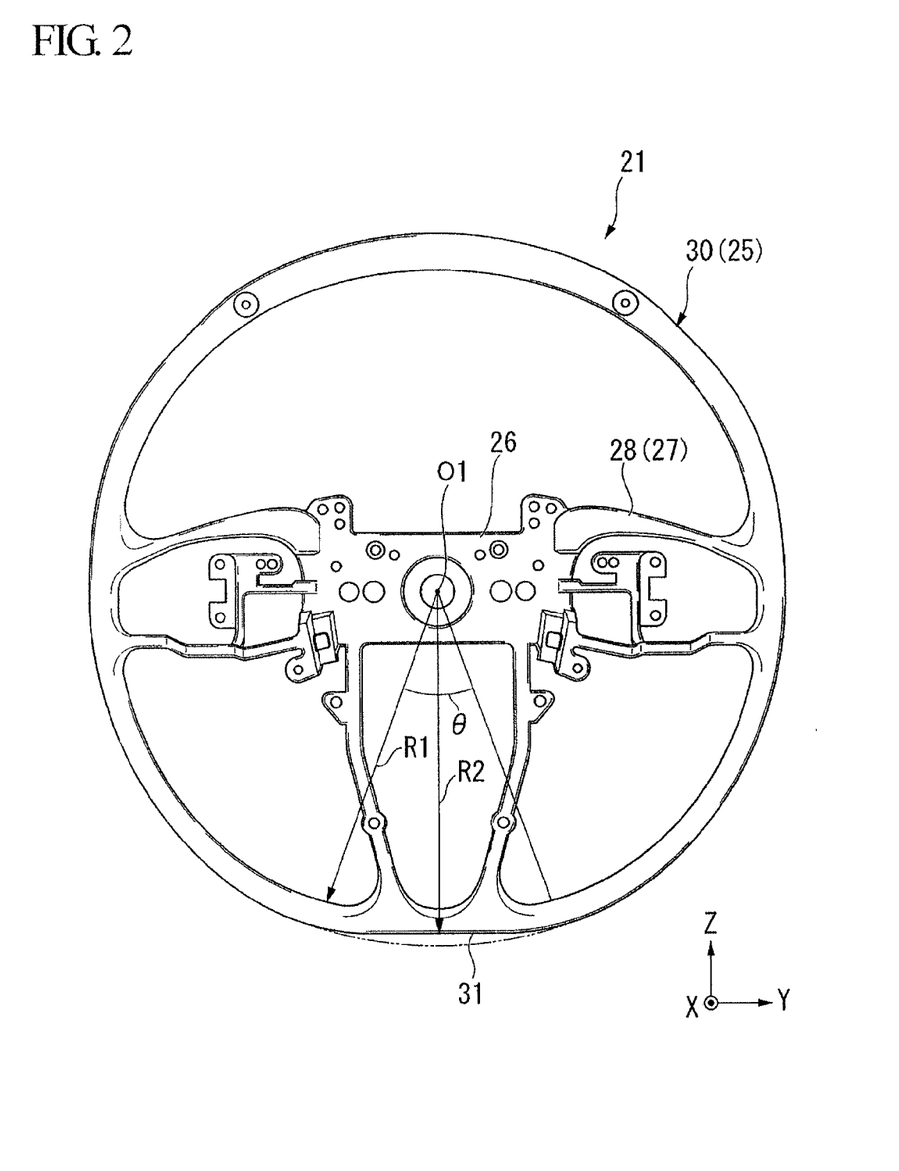
FIG. 2 is a frontal view of a core metal.
Figure 3A:
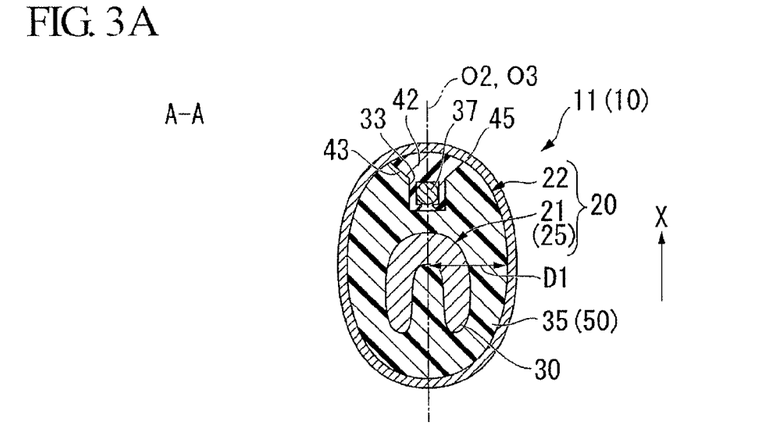
FIG. 3A is a cross-sectional view of a steering wheel according to a first embodiment of the present invention.
Figure 3B:
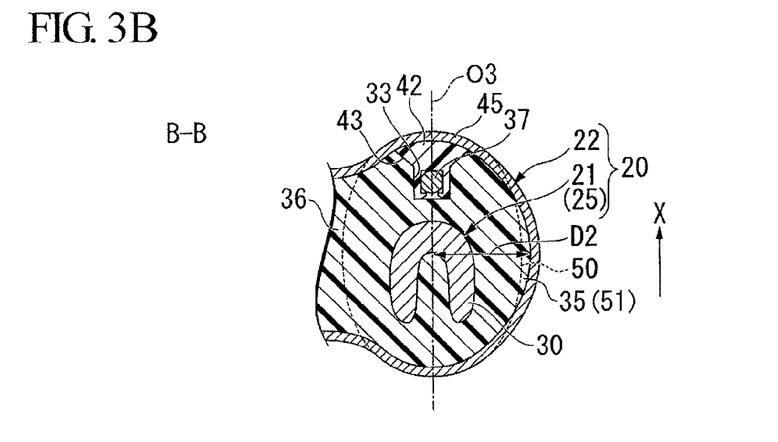
FIG. 3B is a cross-sectional view of a steering wheel according to a first embodiment of the present invention.
Figure 3C:
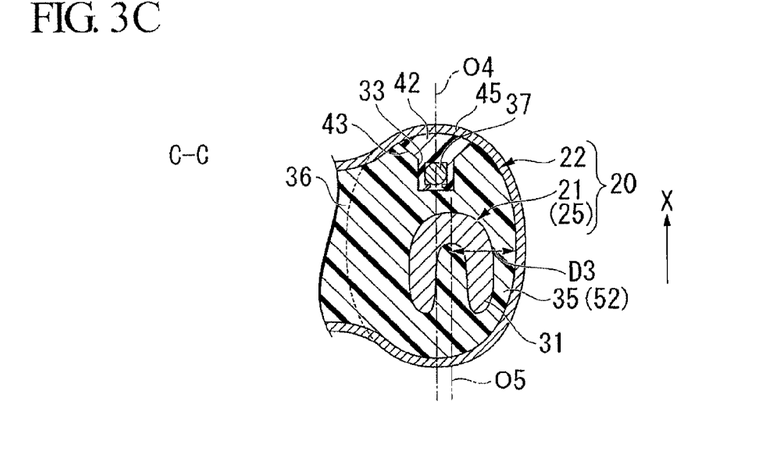
FIG. 3C is a cross-sectional view of a steering wheel according to a first embodiment of the present invention.

FIG. 2 is a plane view of a core metal. FIGS. 3A, 3B, and 3C are cross-sectional diagrams of a rim part shown in FIG. 1. FIG. 3A is a cross sectional view along line A-A of FIG. 1. FIG. 3B is a cross-sectional view along line B-B of FIG. 1. FIG. 3C is a cross-sectional view along line C-C of FIG. 1.

As indicated in FIGS. 2-3B, the steering wheel 10 includes a core metal 21 and a resin layer 22 molding the core metal 21. The steering wheel 10 also includes a core material 20 which forms an external shape of the rim part 11.

The core metal 21 comprises a metallic material such as aluminum. The cross-section of the core metal 21 is shaped approximately like the letter U, or three adjacent sides of a square (i.e., channel shaped). The core metal 21 includes a rim part core metal (rim part) 25, a bottom surface core metal (boss part) 26, and a linking core metal 27. The rim part core metal 25 forms a structure of the rim part 11 (see FIG. 1). The bottom surface core metal 26 forms a structure of the bottom surface of the boss part 12 (see FIG. 1). The linking core metal 27 links the rim part core metal 25 and the bottom surface core metal 26.

Each of the linking core metals 27 includes a pair of side frames 28. The side frames 28 extend from the rim part core metal 25 towards the bottom surface core metal 26. A forming surface of the bottom surface core metal 26 is placed in the -x direction with respect to a forming surface of the rim part core metal 25. The linking core metal 27 extends diagonally so as to cross with the x direction. In addition, an inner half part (a central part in the radial direction) at the side of the bottom surface core metal 26 of the linking core metal 27 forms a side-surface structure of the boss part 12 and an installation frame of the cluster of switches 14 described above. An outer half part (an outer side part in the radial direction) at the side of the rim part core metal 25 of the linking core metal 27 forms a structure of the spoke part 16, 17 (see FIG. 1).

The rim part core metal 25 is non-circular. In particular, the rim part core metal 25 includes a ring part 30 formed along approximately the entire circumference in a circumferential direction, and an offset part 31 which is approximately linear (the curvature radius being approximately infinite) and is formed integrally on a part (the lower-center part in FIG. 2) of the ring part 30 in the circumferential direction.

The center O1 of the ring part 30 is the axial line of the steering column. The inner radius R1 of the ring part 30 is the distance from the center O1 to the inner circumferential surface of the ring part 30.

The offset part 31 is formed so as to connect both end portions of the ring part 30. The range of the offset part 31 corresponds to a predetermined angle θ along the circumferential direction of the rim part core metal 25 (see FIG. 1). Here, the position of the offset part 31 in the radial direction corresponds to a position obtained by offsetting the ring part 30 towards an inner side in the radial direction (see FIG. 1). In other words, the distance R2 (the inner radius of the offset part 31) between the center O1 of the ring part 30 (the axial line of the steering column) and the inner circumferential surface of the offset part 31 is set to be smaller than the inner radius R1 of the ring part 30.

In this case, the offsetting amount Q (the maximum offsetting amount) equals the difference between the distance R2 from the center 1 and the offset part 31 and the inner radius of the ring part 30 (R1−R2). In this way, the offsetting amount of the offset part 31 in the radial direction with respect to the ring part 30 is maximized at the center of the offset part 31 (at the lower end part of the rim part core metal 25). The offsetting amount decreases gradually from the center of the offset part 31 towards both ends in the circumferential direction. As a result, the boundary between the offset part 31 and the ring part 30 forms a smooth, curved surface.

In this way, the rim part core metal 25 is structured so that approximately the entire length in the circumferential direction is formed as a complete circle with an inner radius of R1, while a lower section in the circumferential direction is at a distance R2 which is shorter than the inner radius R1 (see FIG. 2). In addition, the rim part core metal 25 is flat in the z direction. Incidentally, the dotted line in FIG. 2 represents an extrapolation of a circle with a curvature radius if R1.

As shown in FIGS. 3A-3C, the resin layer 22 includes an elastic material such as polyurethane. The resin layer 22 includes a resin layer main body 35 and a linking resin layer 36. The resin layer main body 35 covers the rim part core metal 25. The linking resin layer 36 covers a part of the linking core metal 27 (the outer half portion of the linking core metal 27).

A groove part 33 is formed on the frontal surface of the resin layer main body 35 in the axial direction (+x direction). The groove part 33 is created by cutting off a central portion in the radial direction of the front surface of the resin layer main body 35 along the circumferential direction. The groove part 33 can accommodate a harness 37. The harness 37 electrically connects an indicator 19, provided on the upper section of the rim part 11, and an electrical unit, provided in the inner side of the boss part 12. The groove part 33 is formed from the upper section of the resin layer main body 35 along the circumferential direction, and extends towards the lower section of the resin layer main body 35 (to the opposite side of the indicator retaining part 34, while sandwiching the bottom surface core metal 26). In other words, the harness 37 is placed around each cluster of switches 14, runs through the linking resin layer 36 from the lower portion of the resin layer main body 35, and extends towards the electrical unit. The cluster of switches is placed at the outer rim of the lower half section of the boss part 12. In addition, the opening edge of the groove part 33 is tapered so that the width of the groove part in the radial direction becomes narrow towards the bottom part (back side) of the groove part 33.

In this way, the harness 37 is stored in the groove part 33. A harness cover 42 is provided so as to cover the groove part 33. The harness cover 42 shuts the entire opening of the frontal side of the groove part 33. The external surface of the harness cover 42 is shaped so as to form a continuous, curved plane with the outer surface of the resin layer main body 35. Incidentally, an excised part 43 is formed on both sides of the back surface of the harness cover 42 in the radial direction. The excised part 43 is formed so that the thickness becomes gradually thicker from both sides of the radial direction towards the central part of the radial direction. In addition, the opening edge of the groove part 33 contacts the excised part. As a result, the boundary between the harness cover 42 and the resin layer main body 35 forms a smooth, curved shape without any steps.

In addition, as indicated in FIGS. 1 and 3, the core material 20 is wrapped with a surface skin 45 around approximately the entire surface corresponding to the rim part 11. The surface skin 45 is a sheet-like component including materials such as natural leather and artificial leather. The surface skin 45 thus wraps around the outer surface of the core material 20.

Here, as shown in FIGS. 3A-3C, the cross section of the resin layer main body 35 is shaped approximately as an oval. A major axial direction of this oval is aligned with the x direction, and a minor axial direction of this oval is aligned with the radial direction (i.e., the left-right direction in FIG. 3). In addition, the resin layer main body 35 includes a ring part resin layer 50, an expansion part 51, and an offset part resin layer 52. The ring part resin layer 50 (see FIG. 3A) and the expansion part 51 (see FIG. 3B) cover the ring part 30. The offset part resin layer 52 (see FIG. 3C) covers the offset part 31.

As shown in FIG. 1, the ring part resin layer 50 is formed so as to mainly cover the ring part 30 between each of the spoke parts 16, 17 in the circumferential direction of the rim part 11. In detail, the ring part resin layer 50 is formed along an upper half portion of the rim part 11 in the circumferential direction. At the same time, the ring part resin layer 50 is formed at a region in a lower half portion of the rim part 11 excluding the offset part 31, in other words, at both sides of the offset part 31 in the lower half portion in the circumferential direction.

As shown in FIG. 3A, a ring part 30 is formed at a center portion of the ring part resin layer 50 in the minor axial direction (radial direction) of the ring part resin layer 50. In other words, the thickness D1 of the ring part resin layer 50 at both sides of the ring part 30 in the radial direction is set to be equal. A central line O2 of the ring part resin layer 50 in the minor axial direction matches with a central line O3 of the ring part 30.

Furthermore, as shown in FIG. 1, an expansion part 51 is formed so as to expand the ring part resin layer 50 towards the outer side of the radial direction. The expansion part 51 is positioned at a region corresponding to an outer side of each first spoke part 16 in the radial direction (in other words, at a position with a phase difference of ±90 degrees from the center of the offset part 31 in the circumferential direction). Thus, the expansion parts 51 face each other in the radial direction, with the boss part 12 placed in between. In the circumferential direction, this expansion part 51 is positioned so as to be flanked by each ring part resin layer 50. In particular, as shown in FIG. 3B, at the region where the expansion part 51 is formed, a thickness D2 from a center line O3 of the ring part 30 towards the outer side of the radial direction (in other words, a length of a minor axis) is set to be thicker (longer) than a thickness D1 from a center line O2 of the ring part resin layer 50 towards the outer side of the radial direction (in other words, the length of a minor axis) (see FIG. 3A). In addition, the thickness D2 from the center line O3 of the ring part 30 towards the outer side of the radial direction is set to be thicker than a thickness from the center line O3 towards the inner side of the radial direction. Therefore, the external appearance of the resin layer main body 35 is such that a length of the resin layer main body 35 in the y direction is longer than a length of the resin layer main body 35 in the z direction.

Further, the expansion part 51 is formed so that the thickness D2 of the expansion part 51 towards the outer side of the radial direction becomes gradually thinner from the center of the expansion part 51 in the circumferential direction towards both sides of the circumferential direction. As a result, the boundary portion between the expansion part 51 and the ring part resin layer 50 forms a smooth, continuous surface.

As shown in FIG. 1, the offset part resin layer 52 is formed so as to cover the offset part 31. In addition, as shown in FIG. 3C, inside the offset part resin layer 52, an offset part 31 is placed towards the outer circumference of the offset resin layer 52 in the minor axial direction (in other words, the radial direction). In this case, a central line O4 of the offset part resin layer 52 in the minor axial direction is placed towards the inner side of the radial direction compared to a central line O5 of the offset part 31. In other words, a thickness D3 of the offset part 31 from the central line O5 towards the outer side of the radial direction is set to be thinner than the thickness D1 of the ring part resin layer 50 towards the outer side of the radial direction from the central line O3 of the ring part 30. As a result, the external appearance of the resin layer main body 35 is flatter in the z direction compared to the external appearance of the rim part core metal 25. Incidentally, the offset part resin layer 52 according to the present embodiment forms a flat part such that a distance R2 from the center O1 is shrunk compared to an inner radius R1 of the ring part resin layer 50.

In this way, according to the present embodiment, the thickness D3 of the offset part resin layer 52 at an outer side of the radial direction with respect to the offset part 31 is set to be thinner than the thickness D1 of the ring part resin layer 50 at an outer side of the radial direction with respect to the ring part 30.

According to this configuration, even if an offsetting amount Q of the offset part 31 with respect to the ring part 30 is relatively restrained, it is possible to retain a large offsetting amount at the resin layer main body 35 (in other words, an offsetting amount of the offset part resin layer 52 with respect to the ring part resin layer 50). As a result, a non-circular steering wheel 10 can be created with certainty such that, in the circumferential direction of the rim part 11, the distance R2 from the center O1 of the offset part resin layer 52 is shrunk compared to the inner radius R1 of the ring part resin layer 50.

In addition, the thickness D2 from the center line O3 of the ring part 30 towards the outer side of the radial direction is thicker than a thickness from the center line O3 towards the inner side of the radial direction. Thus, the thickness of the ring part resin layer 50 can be expanded compared to the case in which the thickness of the ring part resin layer 50 is set to be equal at both sides of the ring part 30 in the radial direction. In other words, if the y direction is set to be the major axial direction, it is possible to enlarge the ratio between the major axial direction (the y direction) and the minor axial direction (the z direction), compared to the case in which the thickness of the ring part resin layer 50 is set to be equal at both sides of the ring part 30 in the radial direction. Consequently, the overall external appearance of the steering wheel 10 can be formed as a flat shape, crushed in the z direction.

Incidentally, instead of forming the expansion part 51, the thickness D1 of the ring part resin layer 50 at both sides of the ring part 30 in the radial direction may be made constant over the entire circumference of the ring part 30.

Second Embodiment

Figure 4:
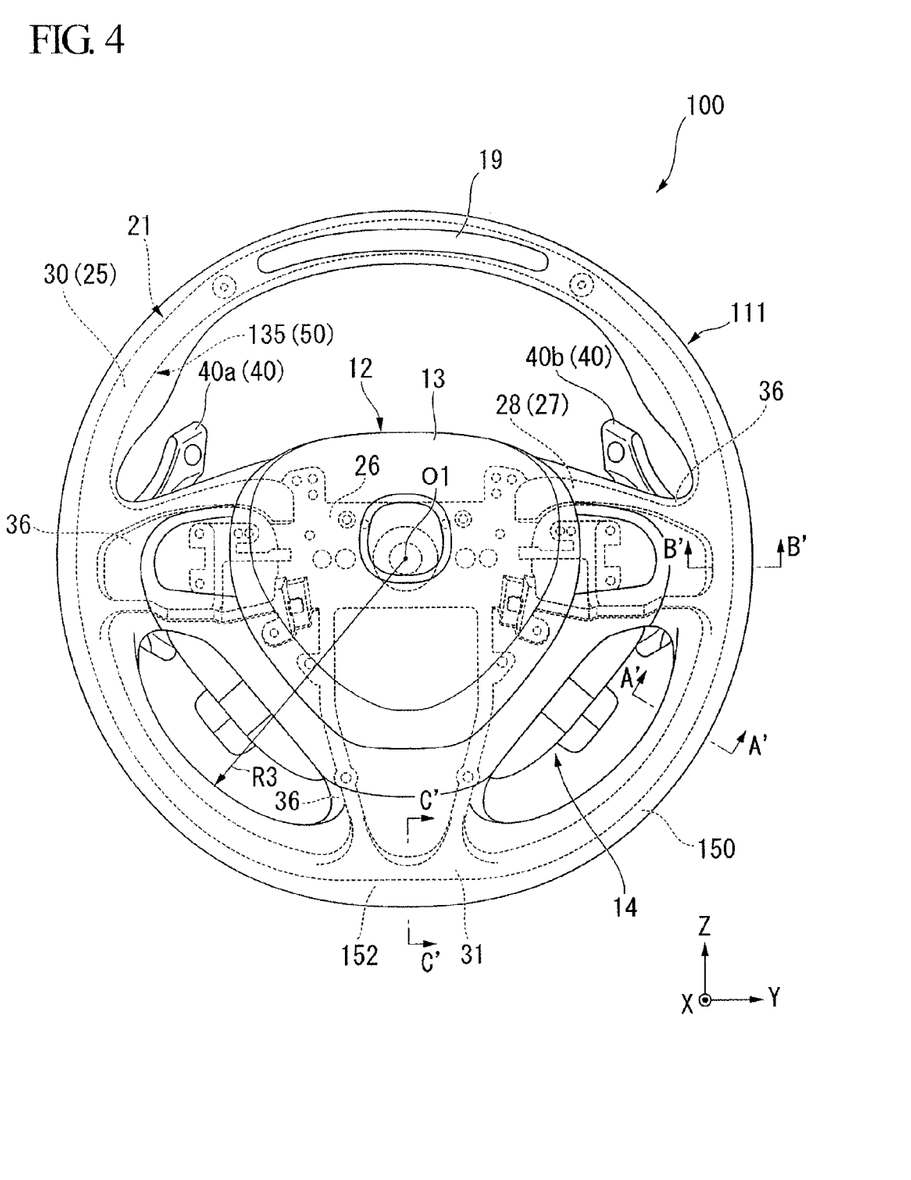
FIG. 4 is a frontal view of a steering wheel according to a second embodiment of the present invention.
Figure 5A:
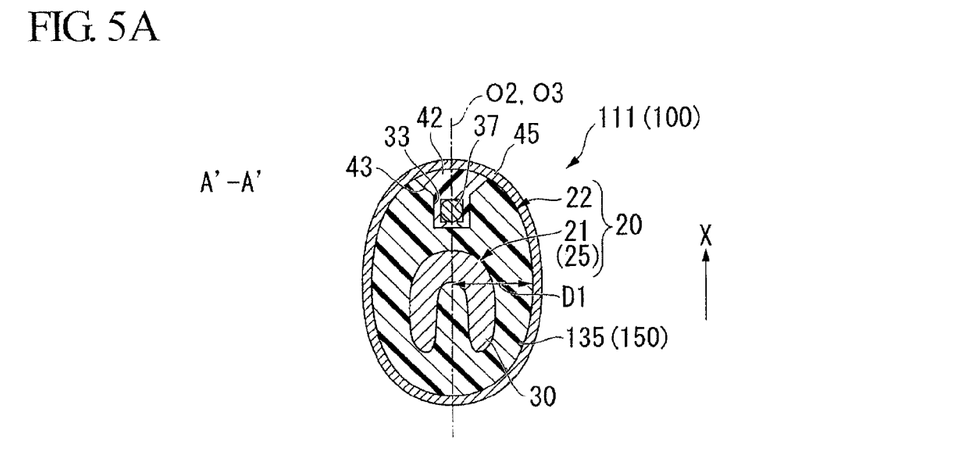
FIG. 5A is a cross-sectional view of a steering wheel according to a second embodiment of the present invention.
Figure 5B:
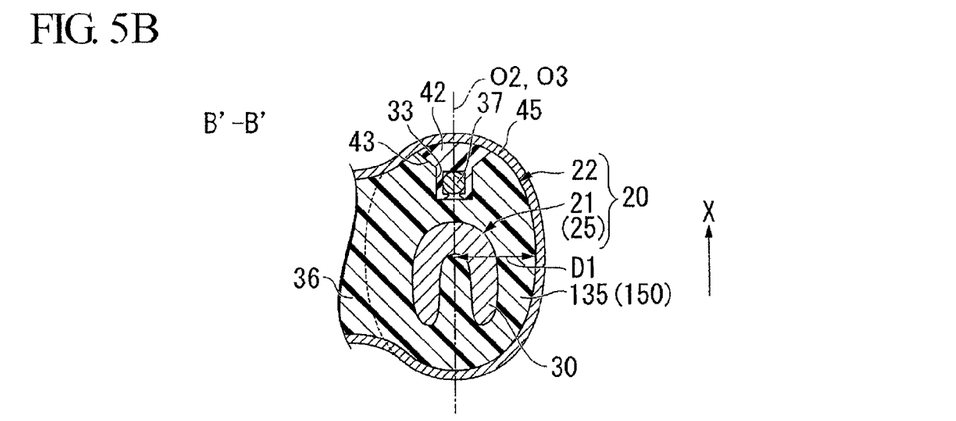
FIG. 5B is a cross-sectional view of a steering wheel according to a second embodiment of the present invention.
Figure 5C:
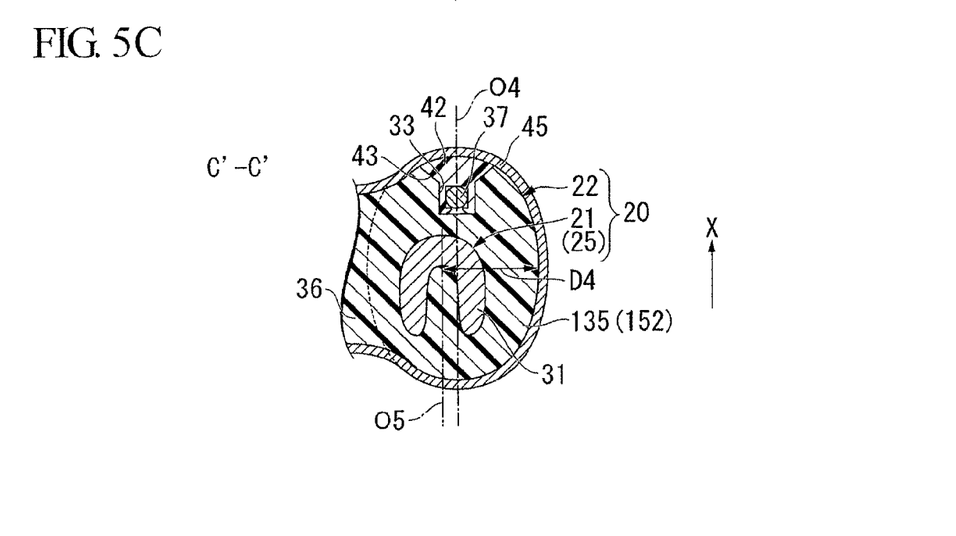
FIG. 5C is a cross-sectional view of a steering wheel according to a second embodiment of the present invention.

Hereinafter, a second embodiment of the present invention is described. FIG. 4 is a plane view of a steering wheel 100 according to the second embodiment of the present invention. In addition, FIGS. 5A to 5C are cross-sectional diagrams of the rim part 111 shown in FIG. 4. FIG. 5A is a cross-sectional view along line A'-A' of FIG. 4. FIG. 5B is a cross-sectional view along line B'-B' of FIG. 4. FIG. 5C is a cross-sectional view along line C'-C' of FIG. 4.

The steering wheel 100 according to the first embodiment differs from the steering wheel described in the first embodiment in that the steering wheel 100 uses the core metal 21 described above, and that the steering wheel 100 forms a resin layer main body 135 which is shaped approximately as a complete circle. Incidentally, in the following descriptions, components which overlap with those described above in the first embodiment are referred to using the same reference numerals. Explanations of overlapping components are omitted.

As shown in FIG. 4, the rim part 111 of the steering wheel 100 according to the second embodiment is formed as a complete circle with an inner radius of R3 along approximately the entire circumference in the circumferential direction.

More specifically, as shown in FIGS. 5A to 5C, the cross-sectional shape of the resin layer main body 135 is approximately an oval such that the major axial direction corresponds to the x direction, and the minor axial direction corresponds to the radial direction. In addition, the resin layer main body 135 includes a ring part resin layer 150 and an offset part resin layer 152. The ring part resin layer 150 covers the ring part 30 (see FIGS. 3A and 3B). The offset part resin layer 152 covers the offset part 31 (see FIG. 3C).

As shown in FIGS. 5A and 5B, the ring part resin layer 150 covers the entire circumference of the ring part 30 in the circumferential direction of the rim part 11. The ring part 30 is placed at a central portion of the ring part resin layer 150 in the minor axial direction (radial direction) of the ring part resin layer 150. In other words, a thickness D1 of the ring part resin layer 150 at both sides of the ring part 30 in the radial direction is equal. A central line O2 of the ring part resin layer 150 in the minor axial direction matches with a central line O3 of the ring part 30.

As shown in FIG. 5C, the offset part resin layer 152 covers the offset part 31. In addition, inside the offset part resin layer 152, an offset part 31 is placed towards the inner circumferential side of the offset part resin layer 152 in the minor axial direction (radial direction). In this case, a central line O4 of the offset part resin layer 152 in the minor axial direction is placed towards the outer side of the central line O5 of the offset part in the radial direction. In other words, the thickness D1 of the ring part resin layer 50 towards the outer side of the radial direction from the central line O3 of the ring part 30 is set to be thinner than the thickness D4 towards the outer side of the radial direction from the central line O4 of the offset part 31.

Here, the central line O4 of the offset part resin layer 152 and the central line O2 of the ring part resin layer 150 are set to be positioned along a same circumference. As a result, the inner radius R3 is the same in both the ring part resin layer 150 and the offset part resin layer 152. The resin layer main body 135 forms a complete circle continuously throughout the entire circumference.

In this way, according to the present second embodiment, the thickness D4 of the offset part resin layer 152 towards the outer side of the radial direction with respect to the offset part 31 is set to be thicker than the thickness D1 of the ring part resin layer 150 towards the outer side of the radial direction with respect to the ring part 30. Consequently, the offset part 31 is placed towards the inner side of the radial direction with respect to the ring part 30.

Thus, even if the non-circular core metal 21, described above in the first embodiment, is used, it is possible to reduce the offsetting amount at the resin layer main body 35 (an offsetting amount of the offset part resin layer 152 with respect to the ring part resin layer 150). In other words, the offset part 31 is placed at an optional position inside the offset part resin layer 152. As a result, the offsetting amount of the offset part 31 can be tolerated inside the resin layer main body. Therefore, a steering wheel shaped as a complete circle can be made by setting a distance from the center O1 at the offset part resin layer 152 equal to a distance from the center O1 at the ring part resin layer 150, both of which are equal to the inner radius R3.

(Manufacturing Method of Steering Wheel)

Hereinafter, a manufacturing method of the above steering wheels 10 and 100 is described below.

First, a manufacturing method of a core material of the steering wheel 10 is described (hereinafter may be referred to as a second creation procedure of a steering wheel).

As shown in FIGS. 2 and 3, the core metal 21 is manufactured by hammering. Further, the resin layer 22 molds so as to cover the surrounding area of the core metal 21. Thus, the resin layer main body 35 is formed on the rim part core metal 25, and the linking resin layer 36 is formed at an outer half portion of the linking core metal 27.

Here, as shown in FIG. 3A, in the resin layer main body 35, at a region where the ring part resin layer 50 is formed (in other words, between each spoke part 16 and 17 in the circumferential direction), the ring part 30 is placed so that the central line O3 of the ring part 30 in the radial direction matches with the central line O2 of the ring part resin layer 50 in the minor axial direction. The ring part resin layer 50 is molded according to this ring part 30.

Furthermore, as shown in FIG. 3B, at a region corresponding to the outer side of each of the first spoke parts 16 in the radial direction, an expansion part 51 is formed by expanding a resin layer 22 towards the outer side of the ring part resin layer 50 in the radial direction.

Meanwhile, as shown in FIG. 3C, in the resin layer main body 35, at a region where the offset part resin layer 52 is formed, the offset part 31 is molded while the central line O4 of the offset part resin layer 52 in the minor axial direction is placed at an inner side with respect to the central line O5 of the offset part 31 in the radial direction. In this way, the offset part resin layer 52 is formed.

Accordingly, a core material 20 is formed such that the core metal 21 is molded by the resin layer 22.

Then, the indicator 19 is assembled to the core material 20. At the same time, the harness 37 of the indicator 19 is stored inside a groove part 33 of the resin layer main body 35. Thus, the electrical unit and the indicator 19 are electrically connected. Further, the harness cover 42 is placed so as to cover the groove part 33 which stores the harness 37.

Next, a surface skin 45 covers the core material 20, the indicator 19, and the harness cover 42.

Lastly, the rim part 11 and the boss part 12 are assembled. In this way, the steering wheel 10 according to the first embodiment is manufactured.

Secondly, a manufacturing method of the steering wheel 100 according to the second embodiment is described (hereinafter may be referred to as a first creation procedure of a steering wheel). The steering wheel 100 according to the second embodiment can be manufactured using a similar core metal 21 used to manufacture the steering wheel 10 according to the first embodiment.

In particular, as shown in FIGS. 2 and 5, a core metal 21, which is similar to the core metal 21 used to manufacture the steering wheel 10, is prepared. The core metal 21 is molded by the resin layer 22.

Here, as shown in FIGS. 5A and 5B, in the resin layer main body 135, at a region at which the ring part resin layer 150 (ring part 30) is created, the ring part 30 is placed while the central line O2 of the ring part resin layer 150 in the minor axial direction matches the central line O3 of the ring part 30. The ring part resin layer 150 is molded along this ring part 30.

Meanwhile, among the resin layer main body 135, at a region at which the offset part resin layer 152 is formed, the offset part 31 is molded by the offset part resin layer 152 while the central line O4 of the offset part resin layer 152 in the minor axial direction is placed at an outer side in the radial direction with respect to the central line O5 of the offset part 31. As a result, an outer radius of the ring part resin layer 150 is formed to be equal to an outer radius of the offset part resin layer 152. Therefore, the resin layer main body 135 is shaped as a complete circle along the entire circumference.

In this way, the core material 20 is formed, such that the core metal 21 is molded by the resin layer 22.

Then, in a manner similar to the manufacturing method of the steering wheel 10 described above, the indicator 19 and the harness cover 42 are set to the core material 20. The core material 20, the indicator 19, and the harness cover 42 are covered by the surface skin 45.

Further, by assembling the rim part 11 and the boss part 12, the steering wheel 100 according to the second embodiment can be manufactured.

Incidentally, when the steering wheel 100 shaped as a complete circle is manufactured using the non-circular core metal 21, as described above, an offsetting amount Q of the offset part 31 must be set, so that the offset part 31 is not exposed from an inner side of the radial direction of the offset part resin layer 152 while the molding is performed.

Figure 6:
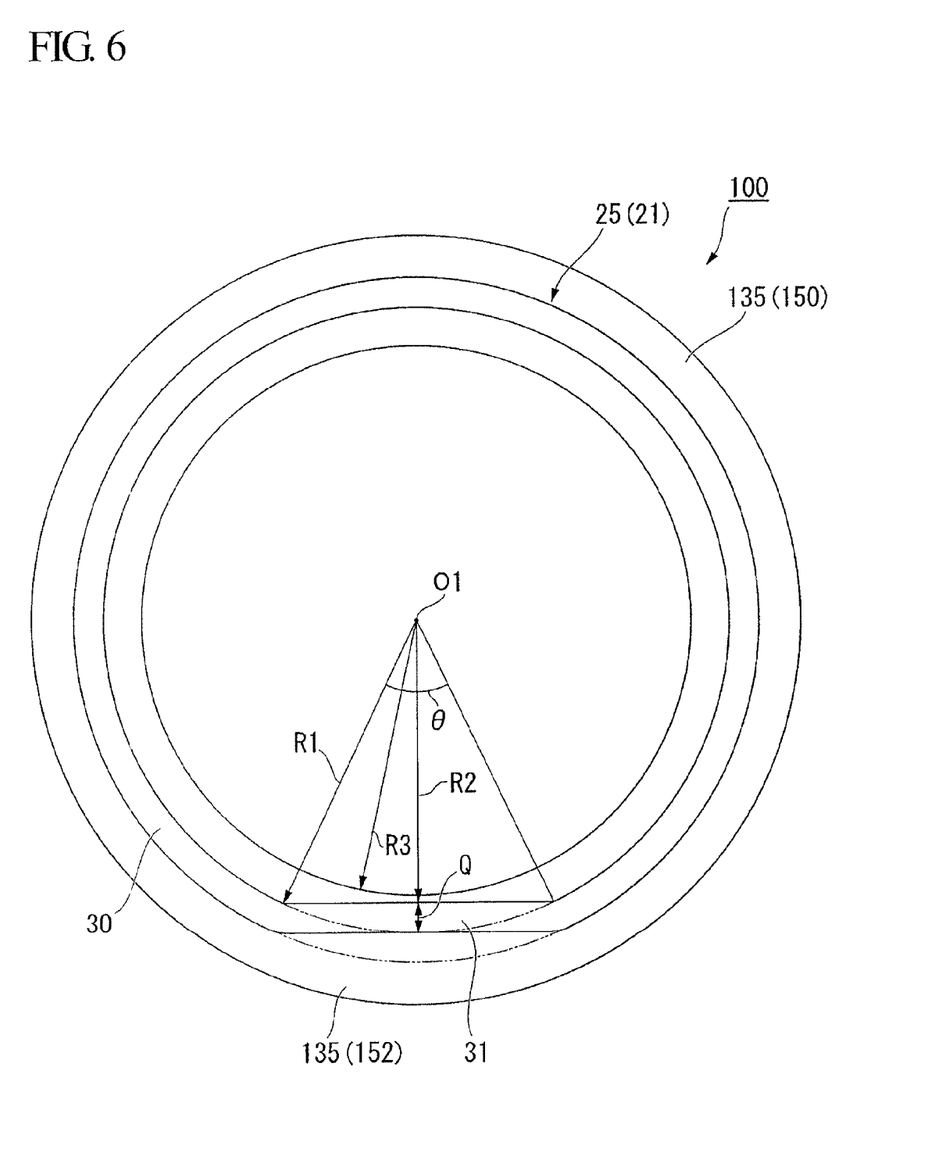
FIG. 6 is a descriptive diagram indicating a setting of an offsetting amount of an offset part.

FIG. 6 is a descriptive diagram indicating a setting of the offsetting amount Q of the offset part 31. FIG. 6 shows a skeletal plane view of the steering wheel 100 (rim part 11).

As shown in FIG. 6, when the offset part 31 is completely covered by the offset part resin layer 152, and the inner radius of the ring part 30 is set to be R1, the distance from the center O1 to the offset part 31 is set to be R2, and the inner radius of the resin layer main body 135 is set to be R3, the following inequality holds:

$$R3 < R2 < R1 \qquad \text{(Inequality 1)}$$

In addition, when the offsetting amount of the offset part 30 is set to be Q (the maximum offsetting amount), the following equation holds:

$$Q = R1 - R2 \qquad \text{(Equation 1)}$$

Here, when a formation angle around the center O1 of the offset part 31 is set to be θ, the following equation holds:

$$R2 = R1 \cos \theta/2 \qquad \text{(Equation 2)}$$

From Inequality 1 and Equation 2, the following inequality holds:

$$R3 < R1 \cos \theta/2 < R1 \quad \text{(Inequality 2)}$$

As a result, the following inequality holds:

$$(R3/R1) < \cos \theta/2 < 1 \quad \text{(Inequality 3)}$$

By setting a value for θ so that Inequality 3 is satisfied, it is possible to prevent the offset part 31 from being exposed from an inner side in the radial direction of the offset part resin layer 152 while the steering wheel 100, shaped as a complete circle, is manufactured. In other words, once the inner radius R1 of the ring part 30 and the inner radius R3 of the resin layer main body 135 are determined, it is possible to determine θ so that the offsetting amount Q is maximized. However, practically speaking, the minimum thickness of the resin layer main body 135 or the surface skin 45 cannot be zero. Thus, it is necessary to determine the offsetting amount Q of the offset part 31 while the thickness is not thinner than the minimum thickness.

In this way, according to the manufacturing method of the steering wheels 10 and 100 based on the present embodiment, a non-circular steering wheel 10 can be manufactured using a non-circular core metal 21 including an offset part 31. At the same time, the steering wheel 100 shaped as a complete circle can be created as well. In other words, the steering wheel 100 shaped as a complete circle and a non-circular steering wheel 10 can be manufactured using the same core metal 21.

As a result, it is possible to share the core metal 21. Thus, it is not necessary to create a core metal 21 for each shape of the steering wheels 10 and 100. Therefore, the manufacturing cost can be reduced while enhancing the efficiency in manufacturing the steering wheel. Accordingly, it is possible to easily manufacture a steering wheel 10, 100 having a desired shape.

Since a steering wheel 10, 100 having a desired shape can be manufactured using the same core metal 21 without changing the shape of the core metal 21, it is possible to respond quickly to a request for a change in the shape of the steering wheels 10, 100. Thus, the steering wheel can be designed freely.

While a preferred embodiment of the present invention has been described above, it should be understood that these are exemplary of the invention and are not to be considered as limiting the present invention. Additions, omissions, substitutions, and other modifications can be made without departing from the scope of the present invention.

For example, a configuration of the steering wheel itself is not limited to what was described in the above embodiments.

In addition, the external shape and the like of the core metal 21 and the resin layer 22 may be redesigned appropriately. For instance, the curvature radius of the offset part 31 may be redesigned appropriately. Furthermore, a plurality of offset parts 31 may be provided along the circumferential direction.

What is claimed is:

1. A manufacturing method of a steering wheel of a vehicle comprising a steering wheel main body comprising a rim part being ring-shaped, a boss part attached in a side of a steering column, and a metal framework of the steering wheel main body including a core metal of the rim part, wherein
the core metal of the rim part comprises a ring part such that a center of the ring part is the boss part,
the core metal of the rim part further comprises an offset part such that a distance from a center of the boss part to the offset part is smaller than a distance from the center of the boss part to the ring part,
a resin layer covers at least the core metal of the rim part,
the resin layer comprises a ring part resin layer covering the ring part, and an offset part resin layer covering the offset part, and
a thickness of the ring part resin layer at an outer side of the ring part in a radial direction below a position with a phase difference of ±90 degrees from a center of the offset part in a circumferential direction is uniformly formed along the circumferential direction,
the manufacturing method comprising:
a first step of forming a plurality of the metal framework;
a second step of forming a first steering wheel forming the rim part shaped as a complete circle; and
a third step of forming a second steering wheel forming a flat part along a circumferential direction of the rim part, wherein
in the second step of forming the first steering wheel, a first thickness of the offset part resin layer at an outer side of the offset part in the radial direction is set to be thicker than a second thickness of the ring part resin layer at the outer side of the ring part in the radial direction; and
in the third step of forming the second steering wheel, the first thickness of the offset part resin layer at the outer side of the offset part in the radial direction is set to be thinner than the second thickness of the ring part resin layer at the outer side of the ring part in the radial direction.

2. The method according to claim 1, wherein an expansion part having a thickness at the outer side of the ring part in the radial direction that is thicker than the ring part resin layer is formed at a position with a phase difference of ±90 degrees from the center of the offset part in the circumferential direction.

3. The method according to claim 2, wherein the thickness of the expansion part at the outer side of the ring part in the radial direction becomes thinner gradually towards an upper side of the steering wheel main body.

* * * * *